Jan. 4, 1944.   B. C. BOECKELER ET AL   2,338,227
PROCESS OF STERILIZING FERMENTER VESSELS
Filed Dec. 24, 1940
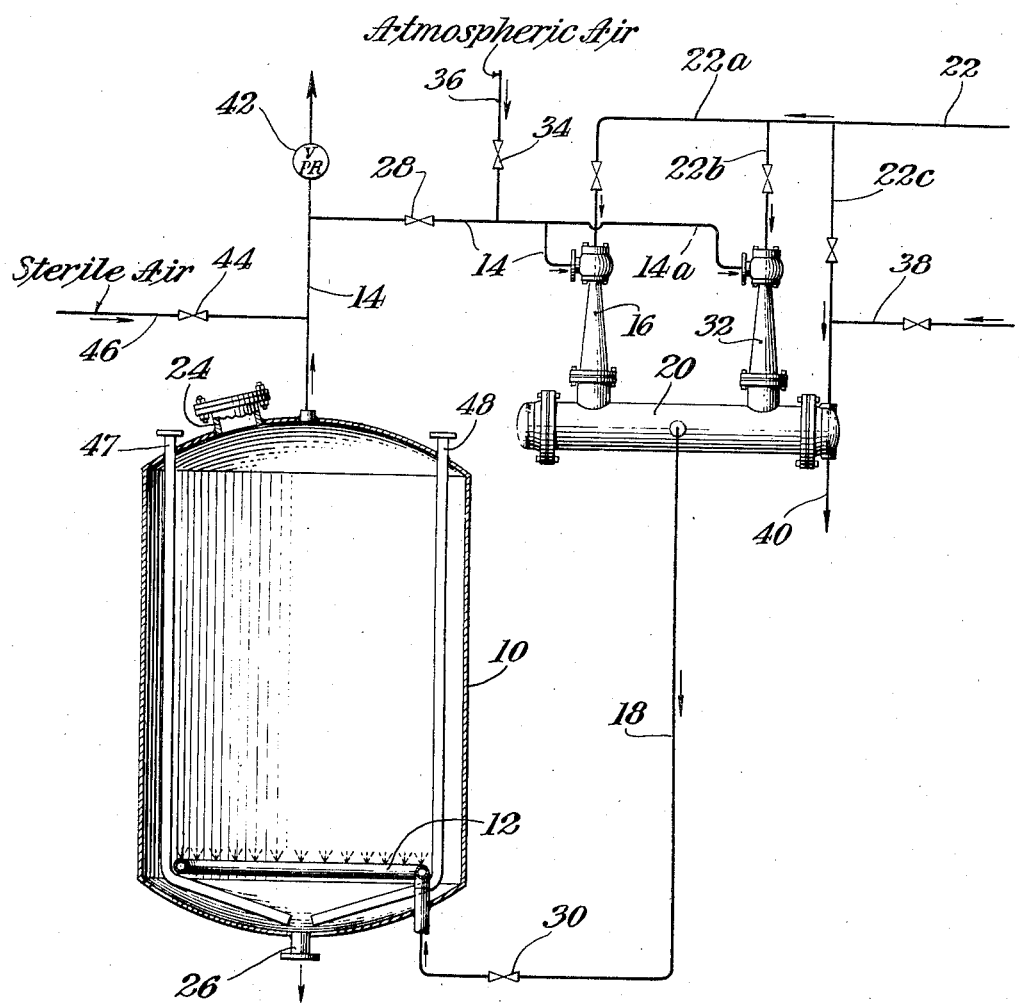
INVENTORS
Benjamin Clark Boeckeler
BY and Marcel J.P. Bogart Patented Jan. 4, 1944

2,338,227

UNITED STATES PATENT OFFICE 2,338,227

PROCESS OF STERILIZING FERMENTER VESSELS

Benjamin Clark Boeckeler, New York, N. Y., and Marcel J. P. Bogart, Teaneck, N. J., assignors to The Lummus Company, New York, N. Y., a corporation of Delaware Application December 24, 1940, Serial No. 371,536

6 Claims. (Cl. 21—56)

This invention relates to improvements in the method of cleaning and sterilizing fermenter vessels used in the fermentation of suitable mashes for the production of solvents or the like.

In the fermentation of mashes by bacteria or similar organisms, it is necessary, after each fermentation has been completed and the fermented mash removed, to sterilize the fermenter vessel to prevent contamination during the next fermentation. Heretofore, the practice has been, upon completion of fermentation, to open up the fermenter and to remove the fermented mash therefrom. Air thus displaced the mash. After the fermenter had been cleaned, low pressure steam was injected directly into the fermenter to sweep out the fermenter gases. The fermenter was then closed up and additional steam injected for purposes of sterilization. Sterile air was then used to displace the steam and to cool the fermenter down to atmospheric temperature preparatory to the introduction of fresh mash. The required apparatus included a low pressure air system, which necessitated a large blower to circulate the sterile air through the fermenter. This system had the disadvantages of being rather costly and very cumbersome. Furthermore, since only low pressure steam could be introduced into the fermenter because of the difficulty and expense of constructing the fermenter to withstand pressures much in excess of atmospheric, a very considerable amount of steam was needed to effect the sterilization; and the temperature of sterilization was thus limited to a little above 212° F. This condition also contributed to the excessive cost of this procedure.

Our invention may be considered an improvement over and a supplement to the invention disclosed in the copending application of B. C. Boeckeler, Serial Number 353,045, filed August 17, 1940, and entitled "Fermentation process." In this application there are described a method and an apparatus for facilitating the fermentation of carbohydrate mashes such as blackstrap molasses by cultures of solvent-producing bacteria such as the butanol-acetone-ethanol-producing organisms of the type *Clostridium madisonii*.

Our invention has more particularly for its object the supplemental process steps of cleaning the fermenter vessel after fermentation followed by sterilization and cooling of the vessel prior to the introduction of new mash and culture thereinto.

More specifically, our invention contemplates the use of certain of the apparatus described in the copending application of Boeckeler and the sequential introduction of cleaning, sterilizing, and cooling media into the fermenter vessel after fermentation of the mash has been carried out.

Further objects and advantages of our invention will appear from the following description thereof taken in connection with the attached drawing, which is a schematic diagram of a preferred form of apparatus for carrying out the invention.

In accordance with our invention, we provide a vessel 10 of the type described in the copending application of Boeckeler, which vessel is particularly adapted for carrying out the bacterial fermentation of various mashes and which may be specifically adapted for the fermentation of blackstrap molasses by *Clostridium madisonii* as heretofore mentioned. Such vessels are usually of very large size and commonly have a diameter of 20 feet or more and a height of 30 feet or more. Their capacity may be as much as 50,000 to 100,000 gallons or more; in a particular installation to which our invention was applied, the fermenter vessel had a volume of approximately 10,000 cubic feet and was able to handle over 60,000 gallons of mash under operating conditions.

Vessel 10 is conveniently provided with a sparger pipe 12, which is adapted to direct the flow of gas into the vessel near the bottom thereof. As described in the copending application of Boeckeler, gases introduced in this manner during fermentation of the mash increase the agitation to which the mash is subjected and also facilitate the fermentation action itself. These objects are preferably accomplished by circulating a portion of the fermenter gases through line 14, ejector 16, and line 18 to sparger 12. By means of ejector 16 the gases are boosted sufficiently in pressure to overcome the pressure head due to the depth of liquid in vessel 10. The compressed gases are preferably passed through a heat exchanger 20, wherein they may be suitably cooled or heated. Steam for operating the ejector may be supplied from lines 22 and 22a. Means (not shown) may be provided to remove from the exchanger any condensate that may be formed; but such condensate may also be introduced into fermenter vessel 10 without harm. Use of the fermenter gases avoids contamination and prevents the introduction of foreign material which may be harmful.

Our invention contemplates the steps following the completion of the fermentation action, which steps are necessary to sterilize the fermenter vessel and to prepare it for the next fermentation. Our improved process includes removing the fermented mash from the fermenter after the fermentation reaction has been completed, introducing air at substantially atmospheric pressure and temperature into the fermenter to sweep the fermenter gases therefrom, thereafter circulating said air at substantially the same pressure but at an elevated temperature through the fermenter to kill off any bacteria that may be present, and finally introducing air at substantially atmospheric temperature into the fermenter to cool it down prior to further fermentation. Preferably steam is introduced into the circulating air during the sterilization step, and sterile air is utilized to effect the cooling of the fermenter. Since the fermenter fills with air when the fermented mash is withdrawn, the first step of introducing atmospheric air may be omitted if such operation is found suitable or desirable. Although any suitable means may be employed to accomplish the introduction of these various media into the fermenter, we find that a steam jet ejector is most effective. In such case, furthermore, the steam already mentioned may be directly introduced into the circulating air.

After the fermentation has been completed, manhole cover 24 is removed, and the fermented mash is withdrawn from vessel 10 through outlet 26. After the fermented mash has been withdrawn, vessel 10 contains a mixture of fermenter gases and air which has entered through the open manhole. During the withdrawal of the fermented mash, valves 28 and 30 in lines 14 and 18 may be closed if desired. Before the vessel can be used for another fermentation, however, it is necessary to remove the fermenter gases and to sterilize the vessel. A secondary steam jet ejector 32, steam for which is supplied by lines 22 and 22b, is now brought into operation. Valve 34 in atmospheric air line 36 is opened, valve 30 is opened, and air is then forced through exchanger 20 and sparger 12 to sweep the mixture of fermenter gases and air from vessel 10. The design of ejector 32 is preferably such that it has a very high capacity against a low head. While this operation is being carried on, water from line 38 is circulated through exchanger 20 to condense the steam from the ejector and to maintain the air in cooled condition. Although the use of such cooling water is desirable to enable a person to later enter and inspect the fermenter, it may be omitted. This operation is continued until substantially all the fermenter gases have been eliminated from the fermenter. Outlet 40 is provided for removal of the cooling water introduced at 38.

When the fermenter gases have been removed, it is then necessary to sterilize the fermenter. First, however, any deposits of solids or the like remaining in the fermenter are cleaned out in the usual manner. Manhole cover 24 is then replaced, valve 28 is again opened, valve 34 is closed, and steam from lines 22 and 22c is passed through heat exchanger 20. Any condensate that may form from this steam may be conveniently removed through the line 40. The steam in line 22 is preferably at a pressure considerably above atmospheric so that it will be possible to materially raise the temperature of the mixture of air and steam circulated through vessel 10. The circulation of air and steam is continued until the desired degree of approach to sterility has been obtained. Pressure relief valve 42 is provided to prevent the pressure in vessel 10 from becoming excessive.

Because of the resulting temperature difference between the interior of vessel 10 and the external atmosphere, some steam condensation will take place on the pipe walls and the surfaces of the fermenter. The rate of heat input to the fermenter, however, is maintained such that the resulting average temperature in vessel 10 will be substantially above 212° F. and will be sufficient to insure destruction of bacteria. The so-called "wet heat" thus obtained on the fermenter surface is particularly effective in the destruction of bacteria. By appropriate operation of ejector 32, it is readily possible to maintain a sufficiently elevated temperature in the fermenter for as long a period as may be desired.

Following the sterilization treatment, it is desirable to cool down the fermenter prior to the introduction of fresh mash for the next fermentation. In this case, it is preferable to introduce entirely sterile air instead of atmospheric air to compensate for the decrease in volume caused by the condensation of the steam. This operation is accomplished by opening valve 44 in sterile air line 46. Water is again passed through the heat exchanger 20, and the sterile air is circulated by means of ejector 32 through the fermenter, which can thus be rapidly cooled to the desired degree. The condensate is preferably retained in the vessel. At the completion of such operation, the fermenter contains sterilized air at room temperature and atmospheric pressure. Then, after valve 44 has been closed, fresh mash may be charged to fermenter 10 through inlet 47 and subsequently inoculated with the appropriate organism introduced through the inlet 48 for fermentation.

The application of our invention to the 10,000 cubic foot fermenter heretofore mentioned will now be described. In this particular case, ejector 32 is designed to circulate 500 cubic feet per minute of air against approximately a one pound per square inch gage head. About twenty minutes are required under these conditions to completely sweep the fermenter gases out of the fermenter. The steam for operating the ejectors and for passage through exchanger 20 is at a pressure of 150 pounds per square inch gage, which is considerably in excess of the pressure that the fermenter vessel can normally withstand. With such a pressure, it is possible to obtain a temperature as high as 350° F. within the fermenter. Since the steam used to operate the ejector is at a low pressure after passing therethrough, it will be considerably superheated. The temperature thus obtained is materially greater than that which could be obtained if steam at low pressure, which the fermenter can normally withstand, is introduced directly thereinto. Such temperature may be compared with the 250° F. temperature of fifteen pounds per square inch gage saturated steam. About twenty minutes suffice to bring the fermenter to the proper sterilization temperature, at which the fermenter will be held for a sufficient length of time (in this case, two hours) to accomplish the desired approach to sterility. About 200 pounds of steam will be introduced into the fermenter and will occupy about one-fourth of the volume of the fermenter; the balance of the fermenter volume will be occupied by air. At the end of this operation, water is again passed through exchanger 20, and sterile air circulated through the fermenter for a period of thirty minutes, at the end of which time the fermenter is ready to receive a new batch of fermentable mash.

It will be appreciated that the effectiveness of any fermentation process depends upon a maintenance cycle similar to that herein set forth and the economy of utilities required to place the fermenting apparatus in operating condition. Since no low pressure air system is required, it is possible to eliminate the otherwise necessary blower which, in the above application of our invention, had a capacity of 700 cubic feet per minute. Furthermore, the necessary apparatus to filter and sterilize the air introduced through line 46 is smaller since a less amount of sterile air is required. A considerable saving in equipment is thus made possible. There is also a material steam saving because a smaller volume of steam is introduced into the fermenter and less condensation takes place on the walls due to the blanketing effect of the air.

Furthermore, we are able to sterilize at a relatively low pressure and still not be limited as to temperature inasmuch as the temperature of the steam-air mixture circulated through vessel 10 is determined by the superheating effect of the steam passed through the heat exchanger 20 from line 22. It is thus possible to obtain a much higher temperature than could be obtained by the direct introduction of steam from available sources into the vessel, and a greater degree of sterility is approached more rapidly.

The rate at which steam is introduced insures an average temperature of the atmosphere in the fermenter nearly that of the superheated steam. At the walls, due to the loss of heat through the fermenter wall, the superheat is substantially lost and the temperature drops until some steam is condensed. This "wet heat" is particularly effective against bacteria and the rate of steam feed can be arranged to provide enough condensation, without reducing the average fermenter temperature, for most effective sterilization.

The apparatus for sterilization and cleaning includes at least two essential elements, namely, the ejector 16 and the heat exchanger 20, which are especially adapted for and necessary to the agitation of the mash during fermentation. For the purpose of our invention, it is merely necessary to add an ejector of a different capacity to accomplish the maintenance operations. Since the capacity of the two ejectors differs greatly and since the head against which each must operate is different, it is ordinarily cheaper to operate different ejectors for the different duties rather than to utilize one ejector for both purposes. It is to be noted that, in the above example, the ejector 16 was normally adapted to operate against an eighteen pounds per square inch head and had a capacity of 80 cubic feet per minute of fermenter gases.

While we have shown a preferred form of embodiment of our invention, we are aware that modifications may be made thereto, and we, therefore, desire a broad interpretation of our invention within the scope and spirit of the description herein and of the claims appended hereinafter.

We claim:

1. The process as claimed in claim 6, wherein the high-temperature heat-exchange medium comprises high-pressure steam and wherein such high-pressure steam is also used in the steam ejector.

2. The process of sterilizing a fermenter vessel used in the fermentation of carbohydrate mashes and the like, after removal of the fermented mash from the vessel and after the fermenter gases have been swept from the vessel by introduction thereinto of atmospheric air, which process comprises closing and maintaining said vessel closed to the external atmosphere after said air introduction, introducing superheated steam at substantially atmospheric pressure into the closed vessel to mix with the introduced air remaining therein, circulating the resulting mixture of air and superheated steam in a continuous stream and in a closed circuit including the vessel for a time sufficient to insure sterilization of the vessel, supplying heat to such mixture during the circulation thereof to maintain the elevated temperature of the mixture, then cooling said circulating stream to cool said closed vessel to atmospheric temperature and cause condensation of the steam, and, during such cooling of the stream, continuously introducing thereinto sterile air to compensate for the decrease in volume of said stream caused by the condensation of the steam and to maintain the closed vessel sterile for reception of a fresh charge of mash.

3. The process of sterilizing a fermenter vessel used in the bacterial fermentation of carbohydrate mashes, after removal of the fermented mash from the vessel and after the fermenter gases have been swept from the vessel by introduction of air thereinto, which process comprises closing the vessel to the external atmosphere and circulating in a closed circuit including said vessel an atmosphere of air and steam at a pressure slightly above atmospheric and at a temperature substantially in excess of that for saturated steam at said pressure for a time sufficient to destroy substantially all the bacteria within the vessel.

4. The process of sterilizing a fermenter vessel used in the fermentation of carbohydrate mashes, after removal of the fermented mash and after the fermenter gases have been swept from the vessel by introduction of air thereinto, which process comprises closing the vessel to the external atmosphere, circulating in a stream and in a closed circuit including said vessel an atmosphere of air and steam at a pressure slightly above atmospheric and at a temperature substantially in excess of that for saturated steam at said pressure for a time sufficient to destroy substantially all the bacteria within the vessel, the rate of such circulation being such that the rate of heat input into the vessel is exceeded by the rate of heat dissipation through the vessel wall only to such an extent that "wet heat" condensation may take place upon said wall, supplying heat to said stream during circulation thereof to maintain the elevated temperature of the stream, and then circulating sterile air at a lower temperature through said closed vessel to cool the latter and maintain it sterile for reception of a fresh charge of mash.

5. The process of sterilizing a fermenter vessel used in the bacterial fermentation of carbohydrate mashes, after removal of fermented mash from the vessel and after the fermentter gases been swept from the vessel by introduction thereinto of air at substantially atmospheric pressure and temperature, which process comprises closing the vessel to the external atmosphere after said air introduction, circulating the remaining introduced air at substantially atmospheric pressure but at an elevated temperature in a closed circuit including the vessel for a time sufficient to effect sterilization of the vessel, maintaining the air at such temperature during circulation thereof, then introducing sterile air at substantially atmospheric temperature into the closed vessel, and circulating the sterile air through said closed vessel to cool the latter and maintain it sterile for reception of a fresh charge of mash.

6. The process of sterilizing a fermenter vessel used in the fermentation of carbohydrate mashes and the like, after removal of the fermented mash from the vessel and after the fermenter gases have been swept from the vessel by introduction thereinto of atmospheric air, which process comprises closing and maintaining said vessel closed to the external atmosphere after said air introduction, injecting superheated steam at substantially atmospheric pressure into said closed vessel to mix with the introduced air remaining therein, circulating the resulting mixture of air and superheated steam in a continuous stream and in a closed circuit including the vessel by passage of the mixture through a steam ejector for a time sufficient to insure sterilization of the vessel, passing said stream during circulation thereof in indirect heat exchange relation with a high-temperature heat-exchange medium to maintain the elevated temperature of the stream, then cooling said stream during the circulation thereof by passing it in indirect heat exchange relation with a cooling medium to thereby cool the closed vessel and cause condensation of the steam, and, during such cooling of the stream, continuously introducing thereinto sterile air to compensate for the decrease in volume of said stream caused by the condensation of the steam and to maintain the closed vessel sterile for reception of a fresh charge of mash.

BENJAMIN CLARK BOECKELER.
MARCEL J. P. BOGART.